March 20, 1973    R. L. ALLISON ET AL    3,720,991
MACHINE FOR SEALING BALLOONS AND THE LIKE
Filed April 12, 1971    4 Sheets-Sheet 1

INVENTORS.
RUDOLPH L. ALLISON
GARY L. LINDSTRAND
BY
Wolfe, Hubbard, Leydig, Voit & Osann, Ltd.
ATTORNEYS.

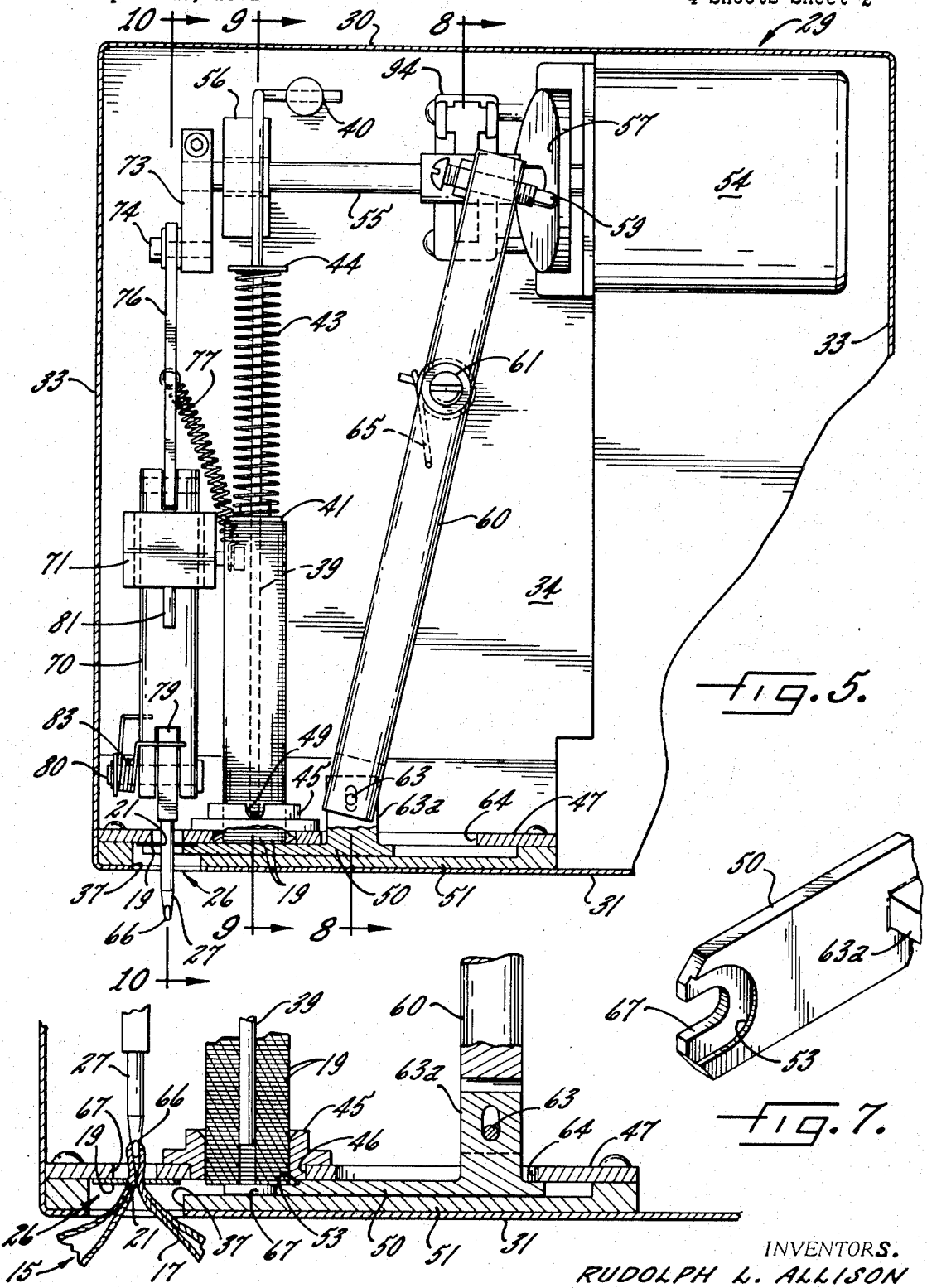

March 20, 1973 R. L. ALLISON ET AL 3,720,991
MACHINE FOR SEALING BALLOONS AND THE LIKE
Filed April 12, 1971 4 Sheets-Sheet 3
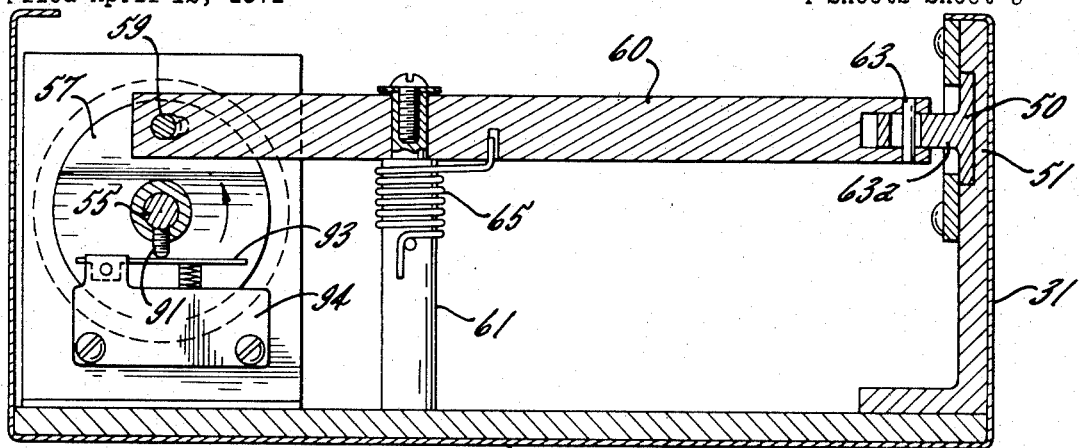
_Fig. 8._
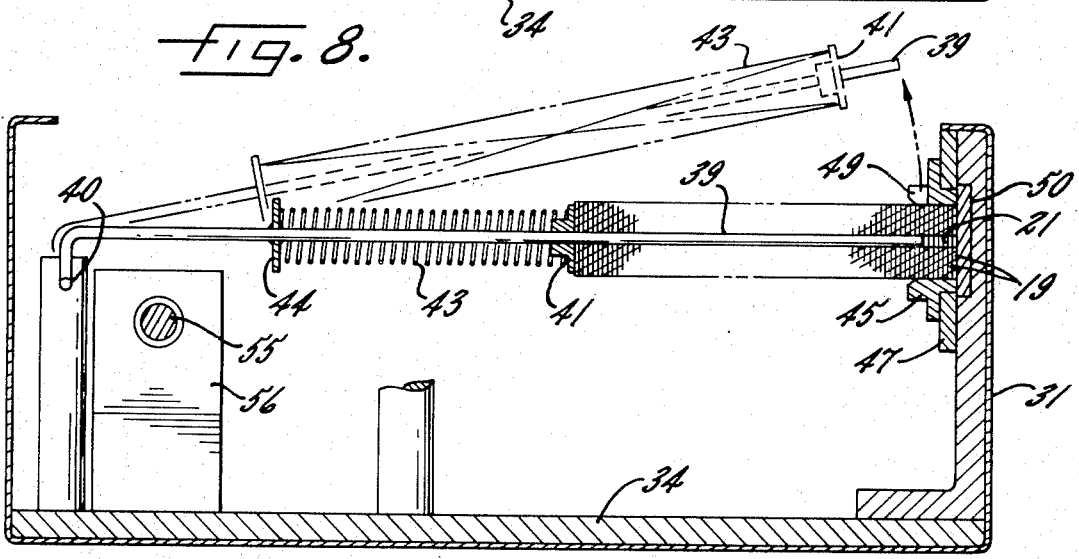
_Fig. 9._
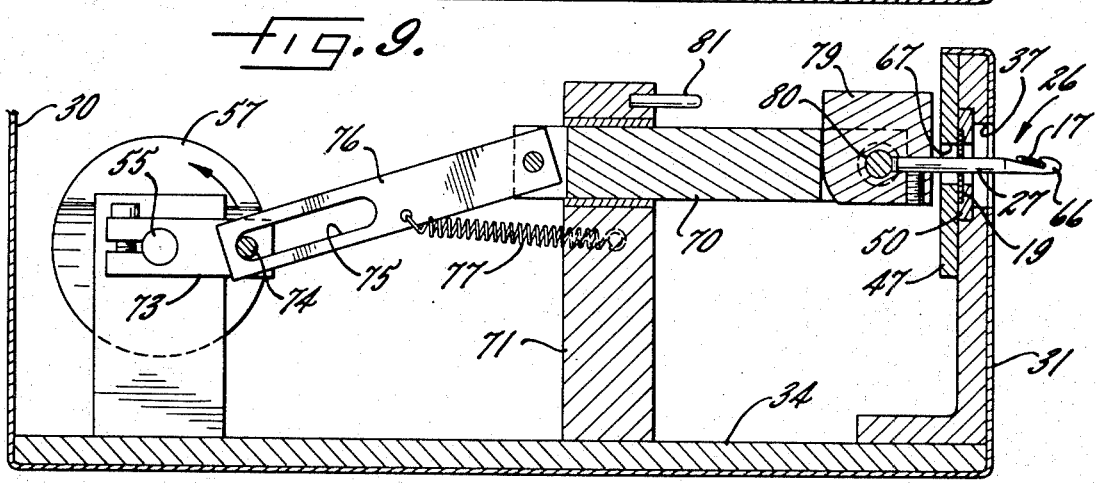
_Fig. 10._
INVENTORS.
RUDOLPH L. ALLISON
GARY L. LINDSTRAND
BY
Wolfe, Hubbard, Leydig, Voit & Osann, Ltd.
ATTORNEYS.

March 20, 1973     R. L. ALLISON ET AL     3,720,991

MACHINE FOR SEALING BALLOONS AND THE LIKE

Filed April 12, 1971     4 Sheets-Sheet 4

INVENTORS.
RUDOLPH L. ALLISON
GARY L. LINDSTRAND
BY
Wolfe, Hubbard, Leydig, Voit & Osann, Ltd.
ATTORNEYS.

United States Patent Office 3,720,991
Patented Mar. 20, 1973

3,720,991
MACHINE FOR SEALING BALLOONS AND THE LIKE
Rudolph L. Allison and Gary L. Lindstrand, Rockford, Ill., assignors to MTL Incorporated, Rockford, Ill.
Filed Apr. 12, 1971, Ser. No. 133,143
Int. Cl. B23g 7/10
U.S. Cl. 29—211 D
11 Claims

ABSTRACT OF THE DISCLOSURE

The machine includes a reciprocating needle which doubles over the neck of the balloon and draws the neck through a hole in a disc. The latter seals the balloon gastight by pinching together the doubled-over section of the neck.

BACKGROUND OF THE INVENTION

This invention relates to a machine for effecting gastight sealing of bag-like articles and, while being applicable to articles of various different types, the machine is particularly useful in the sealing of newly inflated toy balloons to prevent the escape of gas from the balloons.

SUMMARY OF THE INVENTION

One of the objects of the present invention is to provide a machine for sealing an article such as a balloon with an extremely gas-tight seal, for sealing the balloon in a fast and simple manner without need of either typing cord to or permanently knotting the neck of the balloon and, at the same time, for sealing the balloon less expensively than has been possible heretofore with prior cordless and knotless seals.

A further object is to provide a machine which seals the balloon tightly and securely while providing a seal which may be released quickly and easily to enable selective deflation of the balloon.

An additional object is to provide a machine for securely anchoring a string to the balloon automatically as an incident to sealing the balloon.

Another object is to achieve the foregoing aims and, at the same time, to provide a machine for sealing the balloon with an apertured sealing disc which not only is effective to pinch and seal the neck of the balloon but which also may optionally serve to anchor a string to the neck.

A further aim of the invention is to provide a new and improved machine for automatically attaching the sealing discs to the balloons in a rapid and easy manner.

The invention further resides in the unique construction of the machine to enable comparatively low-cost manufacture of the machine and to enable fail-safe and substantially trouble-free operation of the machine during service use.

These and other objects and advantages of the invention will become more apparent from the following detailed description when taken in conjunction with the accompanying drawings.

BRIEF DESCRIPTION OF THE DRAWINGS

FIG. 5 is an enlarged fragmentary plan view of the machine illustrated in FIG. 4 with the top cover removed and with parts broken away and shown in section.

FIG. 6 is an enlarged view of parts illustrated in FIG. 5 with certain ones of the parts being shown in moved positions.

FIG. 7 is a fragmentary perspective view of a stripper for feeding the sealing discs.

FIGS. 8, 9 and 10 are cross-sections taken substantially along the lines 8—8, 9—9 and 10—10, respectively, of FIG. 5.

DETAILED DESCRIPTION OF THE PREFERRED EMBODIMENT

Figure 1:
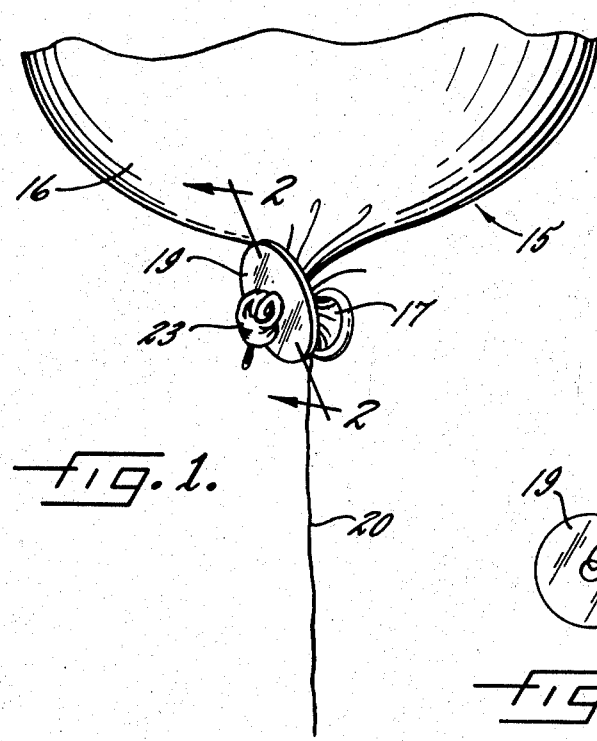
FIG. 1 is a fragmentary perspective view of a balloon adapted to be sealed by a new and improved machine embodying the novel features of the present invention.

The present invention is concerned with sealing a baglike article such as a newly inflated balloon 15 having a body 16 and a neck 17 with a comparatively inexpensive apertured sealing disc 19 which may be attached quickly and easily to the neck to pinch the latter tightly and securely and thereby prevent the escape of gas from the body. In spite of the tight seal thus effected, the sealing disc may be released from the neck easily if there is need to deflate the balloon and, in addition, the disc may be used to anchor a string 20 to the neck if it is desired to provide the balloon with such a string.

More specifically, the sealing disc 19 illustrated herein is made of flexible but self-sustaining plastic, is substantially flat and circular, and is formed with a centrally located hole 21. While the dimensions of the disc may vary, the present disc has an overall diameter of approximately ¾" and a hole with a diameter of about ⅛" and is used in conjunction with a balloon 15 whose neck 17 has an expanded diameter of about ⅝".

Figure 2:
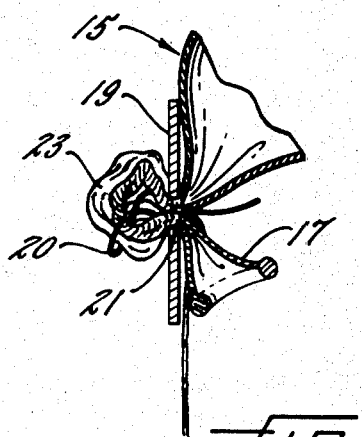
FIG. 2 is an enlarged fragmentary cross-section taken substantially along the line 2—2 of FIG. 1.
Figure 3:
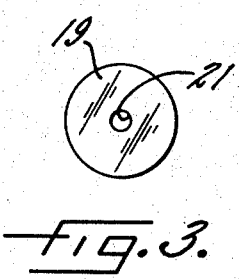
FIG. 3 is a front elevation of the sealing disc.

Sealing of a newly inflated balloon 15 by the disc 19 is effected by first stretching the neck 17 across one face of the disc and then, while holding the body 16 and the outer end of the neck, by forcing an intermediate portion of the neck through the hole 21 sufficiently far to double the neck over upon itself (see FIG. 2). As an incident to being forced through the hole, the doubled-over sections of the neck are contracted and pinched together by the edges of the hole and are held tightly by such edges to effect a good gas-tight seal preventing the escape of gas from the balloon. The resilient fold of the doubled-over sections of the neck expands considerably after passing through the hole and forms a knob 23 (FIG. 2) which is much larger than the hole and which retains the disc securely on the neck to prevent the disc from being dislodged accidentally. If it is desired to deflate the balloon, however, the disc may be released by firmly pulling on the inner and outer ends of the neck to force the doubled-over section reversely through the hole. The ease of deflation afforded by the disc is advantageous in that a retail merchandising outlet may deflate any helium-filled balloons remaining unsold in the evening and may reinflate the ballons for sale at a later time rather than bursting and discarding the unsold balloons.

Figure 4:
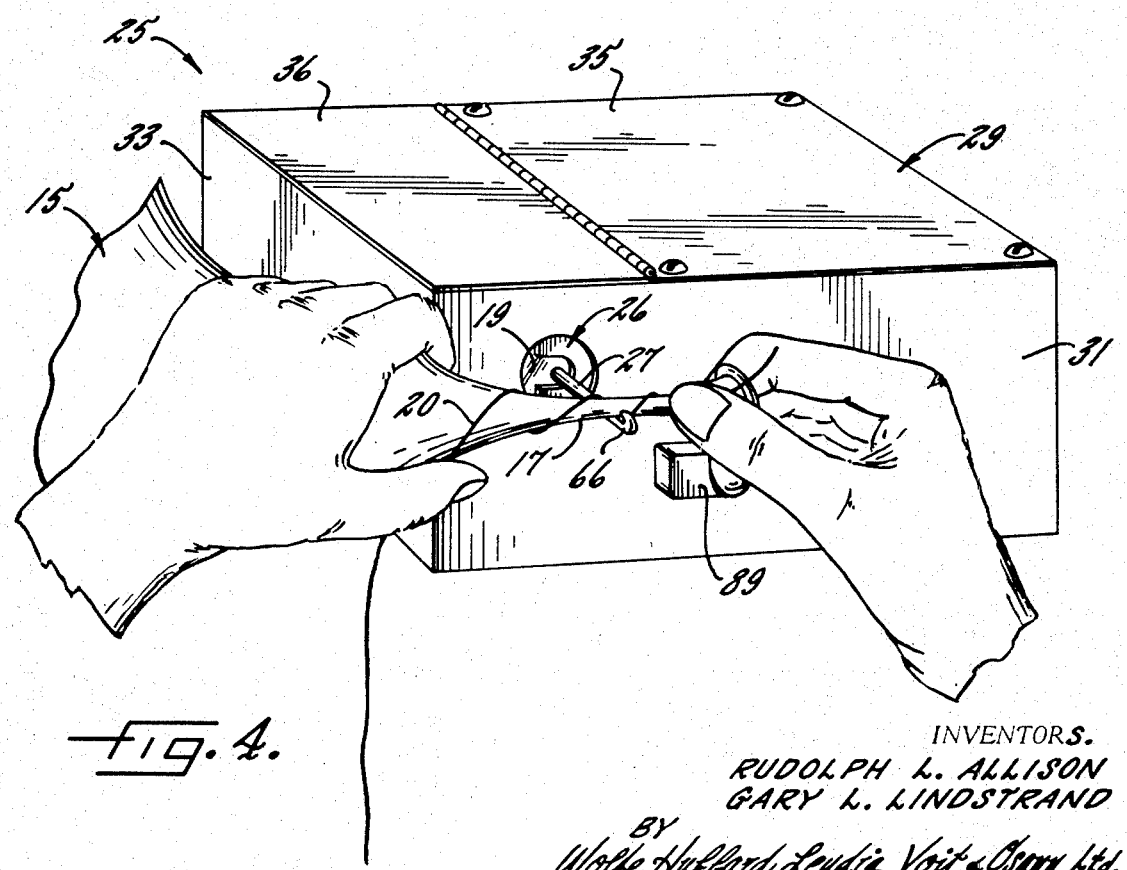
FIG. 4 is a perspective view of the machine for sealing the balloons.

When a string 20 is to be attached to the balloon 15, the string first is simply interwrapped with the neck 17 prior to stretching the neck across the disc 19 (see FIG. 4). The neck and the string may be interwrapped either by spirally winding a short length of the string around the neck or by twisting the neck around the string. Thereafter, the short length of string is forced through the hole 21 in the disc simultaneously with the neck and thus is doubled over upon itself and is gripped by the contracted, doubled-over sections of the neck as shown in FIG. 2. The string thus becomes anchored securely to the neck at the same time the neck is sealed and without need of tying the string.

According to the present invention, a new and improved machine 25 (FIG. 4) is provided for automatically attaching the sealing discs 19 to the balloons 15 in a quick and easy manner. The machine is characterized particularly by its speed and ease of operation, by its comparative simplicity and by the fact that it is fail-safe and relatively trouble-free in service use.

In general, the preferred machine 25 includes a sealing station 26 (FIG. 4) to which successive discs 19 are delivered automatically. Each time a balloon 15 is to be sealed, its neck 17 (either with or without an interwrapped string 20) is stretched manually across the disc in the sealing station and then is engaged by a power driven needle 27 which first forces the neck through the hole 21 in the disc and then releases the doubled-over neck to enable removal of the balloon and the disc from the sealing station prior to delivery of a succeeding disc to the station. The entire sealing operation may be completed in approximately one second and effects secure attachment of the disc and the string to the balloon.

More particularly, the machine 25 includes a main support formed by a box-like cabinet 29 having inner and outer walls 30 and 31 (FIG. 5), side walls 33, a bottom wall 34 (FIG. 8) and a top wall 35 with a hinged lid 36 (FIG. 4). The sealing station 26 is located near one end portion of the outer wall 31 which, adjacent the sealing station, is formed with a hole 37 slightly larger than the discs 19 and positioned to register with each disc delivered to the sealing station. When sealing a balloon 15 with the machine, the neck 17 is stretched across the hole 37 and along part of the outer side of the outer wall 31 as shown in FIG. 4.

Advantageously, a large supply of the discs 19 are stored in face-to-face relation on an easily loadable magazine housed within the cabinet 29. As shown most clearly in FIGS. 5 and 9, the magazine comprises an elongated rod 39 whose inner end is pivoted to the cabinet at 40 to swing upwardly and downwardly. The discs are telescoped over the outer end portion of the rod with the innermost disc engaging a washer 41 slidable on the rod and urged outwardly by a coil spring 43 telescoped over the rod and compressed between the washer and fixed stop 44 on the rod. The outermost discs are telescoped slidably into a tubular bushing 45 (FIG. 6) which is anchored within an opening 46 in a plate 47 connected to the inner side of the outer cabinet wall 31. The outer end of the rod 39 terminates within the bushing but short of the plate 47 and, when the supply of discs on the rod is depleted, the lid 36 of the cabinet 29 may be hinged upwardly and the rod may be swung upwardly about the pivot 40 and through a slot 49 (FIG. 5) in the upper side of the bushing so as to be located in a loading position as shown in phantom in FIG. 9. A new supply of discs initially contained in a paper coin wrapper may then be telescoped over the rod and, after stripping of the wrapper from the discs, the rod may be swung downwardly to its normal position to locate the discs in registry with the bushing 45. When the rod is returned to its normal position and the washer 41 is manually released, the spring 43 forces the outermost discs into the bushing and these discs hold the rod in a centered position relative to the bushing. Thus, it is a relatively simple matter to load the machine 25 with a new supply of discs.

The spring 43 automatically feeds the discs 19 outwardly through the bushing 45 for delivery to the sealing station 26. As shown in FIGS. 5 and 6, a feeding mechanism in the form of a stripper 50 is mounted to move back and forth across the outer side of the bushing so as to pick up the outermost disc from the bushing and to transfer such disc to the sealing station. The stripper is simply a plate-like member (see FIG. 7) which is guided to reciprocate back and forth along the outer wall 31 of the cabinet 29 by the plate 47 and by an additional plate 51 (FIG. 6) spaced outwardly from the first plate and fastened to the outer wall of the cabinet. A generally semi-circular pocket 53 (FIG. 7) is formed in the inner side of one end portion of the stripper 50 and is located to register with the bushing 45 and to receive the outermost disc therein when the stripper is disposed in a retracted position as shown in FIG. 6. When the stripper is shifted horizontally from its retracted position to the position shown in FIG. 5, the disc 19 in the pocket is carried alongside the plate 47 and into the sealing station 26 in registry with the hole 37.

To shift the stripper 50 to and from the sealing station 26, an electric motor 54 (FIG. 5) is housed within the cabinet 29 and is connected to rotate a cycle shaft 55 which is journaled in a bearing 56 supported on the bottom wall 34. A cam 57 (FIGS. 5 and 8) rotatable with the cycle shaft is engageable with a follower 59 on the inner end of a lever 60 and is operable to swing the lever back and forth about a vertical pivot pin 61 secured to the bottom wall 34 and located intermediate the ends of the lever. The outer end of the lever is connected pivotally at 63 to an ear 63a on the stripper 50 and projecting outwardly through a slot 64 in the plate 47. Accordingly, when the lever 60 is swung back and forth about the pin 61, the stripper is shifted toward and away from the sealing station 26.

Advantageously, shifting of the stripper 50 toward the sealing station 26 during the feeding of each disc 19 is effected by the indirect action of a torsion spring 65 (FIG. 8) rather than by the positive action of the cam 57 so that, if the discs become jammed during feeding, the cam may continue to turn without forcing and damaging the stripper or the lever 60. In this instance, the spring 65 is telescoped over the pivot pin 61 and is anchored at its ends to the pin and the lever. As the cam retracts the stripper, the spring is loaded and, when the follower 59 subsequently rides across a fall of the cam, the spring relaxes to shift the stripper toward the sealing station.

The needle 27 for forcing the necks 17 of the balloons 15 through the discs 19 comprises a slender metal rod normally disposed in a horizontal position and formed with an upwardly opening hook 66 (FIGS. 4 and 12) on its outer end. Prior to the beginning of each cycle of operation of the machine 25, the needle projects outwardly through a hole 67 in the plate 47 and also through the hole 21 in the disc 19 in the sealing station 26 so as to locate the hook 66 in an exposed and easily accessible position outwardly of outer wall 31 of the cabinet 29 (see FIGS. 4, 5 and 10). To seal the balloon, the neck 17 is simply stretched across and placed in the hook as shown in FIG. 4 and the needle then is shifted inwardly to cause the hook to draw the neck forcibly through the hole in the disc and thereby double over the neck and anchor the disc to the neck (see FIGS. 6 and 11). Thereafter, the needle is swung downwardly as shown in FIG. 12 to pull the hook out of the doubled-over fold of the neck and, as the neck is released, its elasticity causes itself and the attached disc 19 to pop outwardly through the opening 37 so as to clear the sealing station 26 to receive another disc. Just after the neck is released, the stripper 50 feeds a new disc into the sealing station and, at about the same time, the needle 27 is swung upwardly to its horizontal position and is shifted outwardly. Upon being shifted outwardly, the needle threads through the hole 21 in the newly delivered disc and also passes through an open-sided notch 67 (FIG. 7) formed through the stripper 50 adjacent the pocket 53. The stripper remains in the sealing station and holds the disc, and the needle remains in its outwardly projected position until another cycle of operation is initiated.

Herein, the needle 27 is supported for inward and outward shifting by a rod-like slide 70 (FIGS. 5 and 10) which is mounted to reciprocate within a guide 71 fastened to the bottom wall 34. Inward movement of the slide is effected by a crank 73 rotatable with the cycle shaft 55 and carrying an eccentric pin 74 (FIG. 10) which projects slidably and pivotally through a slot 75 formed in the inner end portion of a link 76 whose outer end is pivotally connected to the inner end of the slide. The crank is rotated counterclockwise (FIG. 10) by the shaft 55 and, as the pin 74 moves toward and across top dead center, the slide is shifted inwardly to pull the needle 27 inwardly and through the hole 21 in the disc 19 (see FIG. 11). The pin 74 simply moves idly in the slot 75 upon rotating toward and across bottom dead center and, during this time, the slide is returned outwardly by a contractile spring 77 stretched between the guide 71 and the link 76. If the needle should happen to strike and stop against an improperly positioned or jammed disc 19 in the sealing station 26, the spring 77 will yield to allow continued rotation of the crank 73 and the shaft 55 in spite of the premature stopping of the needle. Thus, damage to the machine 25 is avoided because of the use of the spring 77 for returning the needle outwardly and because of the lost-motion connection provided between the crank 73 and the link 76 by the pin 74 and the slot 75.

As pointed out above, the needle 27 is swung downwardly to release the neck 17 after the latter is drawn through the disc 19 and then is swung back upwardly before being advanced outwardly through the next disc delivered to the sealing station 26. To mount the needle for up and down swinging, an ear 79 (FIG. 10) is anchored to the inner end of the needle and is mounted pivotally on the outer end of the slide 70 by a horizontal pin 80. After the slide has been retracted inwardly sufficiently far to pull the hook 66 of the needle about ½" inwardly from the disc 19, the upper rear edge of the ear strikes a horizontal stop pin 81 (FIG. 11) projecting outwardly from the guide 71. Engagement of the ear 79 with the stop pin 81 together with continued retraction of the slide 70 causes the needle to swing downwardly out of the fold of the neck 17 thereby to release the neck (see FIG. 12). When the slide is returned outwardly to move the ear 79 away from the pin 81, the needle is swung back upwardly to its normal horizontal position by a torsion spring 83 telescoped over one end of the pin and anchored between the slide and the ear.

Figure 13:
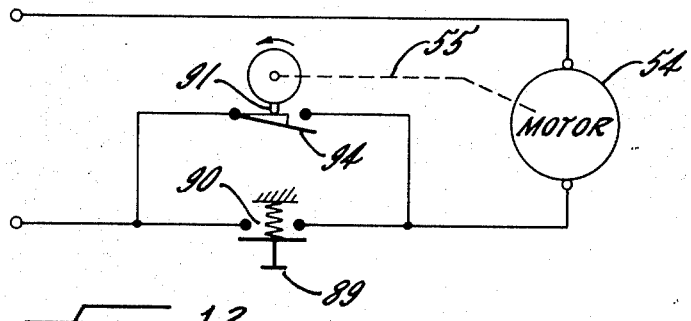
FIG. 13 is a diagram of the control circuit of the machine.

To summarize, the various components of the machine 25 initially are positioned as shown in FIG. 5 with a sealing disc 19 located in the sealing station 26 and held by the stripper 50 and with the hook 66 extending through the disc and positioned outwardly of the outer wall 31 of the cabinet 29. After the neck 17 of a balloon 15 has been stretched across and placed in the hook, operation of the machine may be initiated by momentarily depressing a spring-loaded start switch button 89 (FIG. 4) on the outer wall of the cabinet to momentarily close a start switch 90 (FIG. 13) and thereby energize the motor 54 and initiate rotation of the cycle shaft 55. As soon as the shaft has rotated through a few degrees, a set screw 91 (FIG. 8) on the shaft releases the spring-loaded operator 93 of a normally open cycle switch 94 positioned below the shaft and thereby causes closing of the cycle switch, the latter being connected in parallel with the start switch 90 in the energizing circuit of the motor as shown in FIG. 13. Closure of the cycle switch thus maintains energization of the motor after the start button 89 has been manually released to open the start switch 90.

Figure 11:
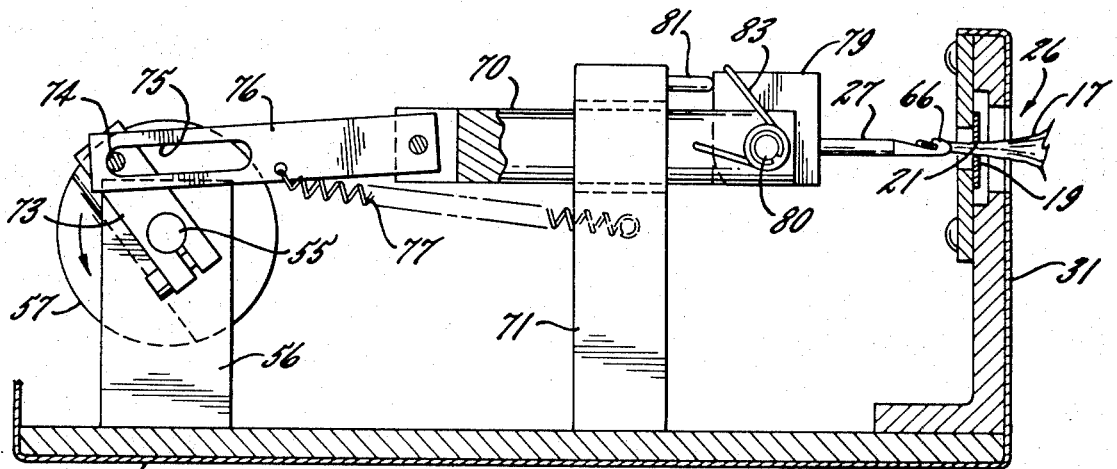
FIGS. 11 and 12 are views similar to FIG. 10 but showing certain parts in successively moved positions.
Figure 12:
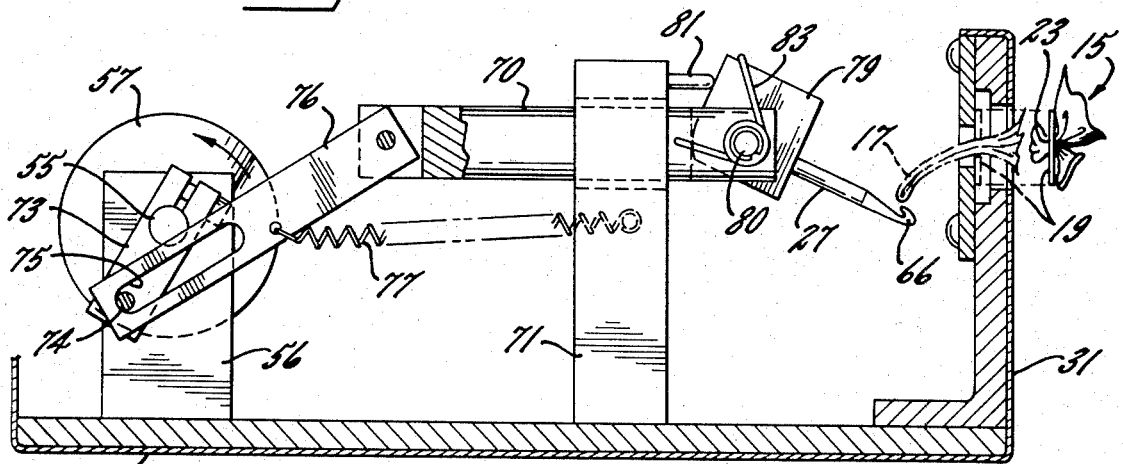

As the cycle shaft 55 begins to rotate, the crank 73 shifts the needle 27 inwardly to draw the neck 17 through the hole 21 in the disc 19 and thereby attach the disc to the neck (see FIG. 11). The needle then is swung downwardly about the pivot pin 80 by the stop pin 81 so as to release the neck and enable the disc to pop outwardly from the cabinet 29 (see FIG. 12). During movement of the needle, the cam 57 retracts the stripper 50 to the position shown in FIG. 6 to enable a new disc to move out of the bushing 45 and into the pocket 53 of the stripper. The stripper then is moved back toward the sealing station 26 by the spring 65 and delivers the new disc to the sealing station. Also, the contractile spring 77 begins to move the needle 27 outwardly and then the torsion spring 83 swings the needle upwardly to its horizontal position. After the needle has moved outwardly through the newly delivered disc held in the sealing station by the stripper, the cycle shaft 55 completes one revolution and the set screw 91 re-engages the cycle switch operator 93 to open the cycle switch 94 and de-energize the motor 54 until another cycle of operation is initiated by depressing the switch button 89.

From the foregoing, it will be apparent that the present invention brings to the art a simple machine 25 for sealing a balloon 15 with an inexpensive seal. Because the springs 65 and 77 actuate the stripper 50 and the needle 27 as these elements approach the sealing station 26, any occasional jamming of the discs 19 will not result in damage to the machine and thus the machine is fail safe.

We claim as our invention:

1. A machine having a sealing station in which the neck of an open-ended bag is sealed gas-tight by a disc having a hole extending therethrough, said machine comprising a support, means on said support and located in said sealing station for holding said disc in a position enabling the neck of the bag to be extended across one face of the disc, a needle mounted on said support for movement into and out of said hole, and mechanism on said support for moving said needle first in a direction to force an intermediate section of said neck through said hole and then in a direction to release said needle from said intermediate section whereby the needle doubles over the intermediate section and the latter is pinched together and held by the edges of said hole as an incident to being forced through the hole.

2. A machine having a sealing station in which balloons are sealed with discs each having a hole extending therethrough, said machine comprising a support, means on said support for storing a supply of said discs in face-to-face relation, mechanism on said support for feeding successive discs from said supply to said sealing station and into a position enabling the neck of a balloon to be extended across the outer face of such disc, a needle having a hook on the outer end thereof and mounted on said support for inward and outward movement through the hole in the disc in the sealing station, said hook, when located outwardly of said hole, being disposed in a position enabling an intermediate section of the neck to be placed in the hook, means operable after the neck has been placed in the hook to move said needle inwardly sufficiently far to move said hook inwardly of said hole thereby to draw said intermediate section through the hole and to double the intermediate section over itself and around said hook, means operable thereafter for moving said hook to a release position in a direction to release the hook from the doubled-over section of said neck, means for thereafter actuating said feeding mechanism to deliver a succeeding disc to said sealing station, and means for returning said hook from said release positioning and for shifting said needle outwardly through the hole in the succeeding disc.

3. A machine as defined in claim 2 in which said storing means comprise a rod mounted on said support to move from a normal position to a loading position, the outer end of said rod being exposed and accessible when the rod is in said loading position thereby to enable telescoping of said supply of discs onto the rod, and a spring telescoped over the inner end portion of said rod and urging said discs outwardly along said rod and toward said feeding mechanism when said rod is in said normal position.

4. A machine as defined in claim 3 in which said feeding mechanism comprises a stripper mounted on said support to move transversely of said rod and toward and away from said sealing station along a path spaced outwardly from the outer end of the rod, said stripper picking up the outermost disc from said supply upon being moved toward said sealing station and being operable during such movement to carry the disc from the supply to the sealing station.

5. A machine as defined in claim 4 in which said means for actuating said feeding mechanism comprises a spring connected to said stripper and operable to urge said stripper toward said sealing station, and an actuator connected to said stripper for returning the latter from said sealing station and operable to load said last-mentioned spring as an incident to said return.

6. A machine as defined in claim 5 in which said actuator comprises a rotatable cam operably connected to said stripper to return the latter from said sealing station, a power driven shaft for rotating said cam, and said means for shifting said needle inwardly being connected to and driven by said shaft.

7. A machine as defined in claim 2 further including a slide movable inwardly and outwardly on said support and carrying said needle, said needle being attached pivotally to said slide and swingable relative to the latter to and from said release position.

8. A machine as defined in claim 7 in which said means for moving said needle to said release position comprises a stop mounted on said support and located to swing the needle in one direction relative to said slide and toward said release position as an incident to inward movement of said slide through a predetermined distance, said means for returning said needle from said release position comprising a spring carried on said slide and urging said needle to swing in the opposite direction.

9. A machine as defined in claim 2 further including a slide movable inwardly and outwardly on said support and carrying said needle, said means for moving said needle inwardly comprising a power driven actuator connected to said slide, and said means for shifting said needle outwardly comprising a spring connected between said slide and said support and located to be loaded as an incident to inward movement of the slide.

10. A machine as defined in claim 9 in which said actuator comprises a power driven crank, and a lost-motion connection between said crank and said slide for transferring motion of the crank to the slide to move the latter inwardly while rendering the crank ineffective to move the slide outwardly.

11. A machine as defined in claim 2 further including an electric motor on said support, a cycle shaft connected to be rotated by said motor and operable to control said feeding mechanism and said means for moving said needle, a start switch connected to said motor and adapted to be momentarily manually actuated to energize said motor and initiate rotation of said shaft, and a cycle switch responsive to rotation of said shaft and connected to said motor to maintain the latter energized after manual release of said start switch and to de-energize said motor upon completion of one revolution of said shaft.

References Cited

UNITED STATES PATENTS 3,208,133    9/1965    Morton _____ 29—208 D

THOMAS H. EAGER, Primary Examiner